FIG_11

FIG_12

FIG_13

3,305,072
PATTERN FORMING MACHINE
Harold J. Young, San Jose, Calif., assignor to FMC Corporation, San Jose, Calif., a corporation of Delaware
Filed May 28, 1965, Ser. No. 459,717
15 Claims. (Cl. 198—34)

The present invention pertains to a machine for arranging single layers of articles into predetermined patterns for subsequent transfer into a stack of like articles for storage, wrapping or packaging.

In the embodiment to be described, this invention concerns a machine which is fed a single file of one of three size ranges of automotive brake drums and arranges a preselected number of the drums into a preselected pattern The pattern layers are assembled with interspersed separators by other apparatus upon a pallet, after which the stack is tied for storage or shipping.

It is the usual practice for brake drum manufacturers to have individual production runs for each of perhaps a dozen or more different sizes of drums, all of which are processed by the same machinery with appropriate tooling for the particular drum being produced. Since the production line flow path in each instance is the same, it is preferable that any machine directly associated with the flow of drums in the production line be easily converted to perform its function with the size of drums being produced. The pattern forming machine of the present invention is installed near the end of the production line to receive finished brake drums and provides simple adjustments which preset the machine to automatically form predetermined single-layer patterns of brake drums of a given size range. Further, the pattern forming machine assembles all sizes of drums into a predetermined area by forming non-symmetrical patterns of certain sizes of drums, and symmetrical patterns of other sizes of drums, whereby all pallet loads have the same lateral dimensions so as to facilitate handling thereof.

An object of the present invention is to provide a machine for arranging articles of uniform shape into predetermined single layer loading patterns.

Another object is to provide a brake drum pattern forming machine which can be preset to one size range of drums and will then separately handle a plurality of different sizes of drums within that size range.

Another object of the invention is to provide a pattern forming machine which can be easily preset to handle articles of a given size, and which will thereafter automatically assemble groups of the same size articles into repetitive patterns, all patterns having the same overall dimensions so that only one pallet size is required for their subsequent stacking.

Another object of this invention is to provide apparatus for forming a single lane of incoming articles into multi-lane asymmetrical patterns.

Another object is to provide a machine for arranging a single lane of incoming articles into plural lanes at a first zone, and for moving the articles to a second zone and rearranging the articles into a different pattern.

A further object is to provide a machine for assembling articles into transverse rows at a first zone, and for releasing selected ones of the articles for assembly at a pattern forming zone.

Another object is to provide a machine for arrangeing pattern layers of articles, and which has control means for presetting the machine to arrange predetermined sizes of articles.

Other objects and advantages of the present invention will become apparent from the following description and from the accompanying drawings, wherein:

FIGURES 7, 8 and 9 are diagrammatic representations of three different patterns of different size brake drums, as automatically assembled by the machine of the present invention.

Briefly, the pattern forming machine 20 (FIG. 1) is adapted to arrange more than fifteen different diameters of drums into one of three preselected patterns, or size ranges, and includes a planar assembly of constantly driven rollers 22 which are fed a single file of finished automotive brake drums BD, hub end up, by associated conveying means 24. The incoming single file of drums is transported by the rollers 22 through an inlet zone 26 where the drums are retained in single file, across an accumulating zone 28 wherein the drums can accumulate in random patterns, and into multiple lanes at a staging zone 30 in which the drums are temporarily held for subsequent release in lateral rows.

At predetermined times, the leading row of drums (which row may be formed of either aligned or staggered brake drums) is released for travel into a pattern forming zone 32. The brake drums are individually arrested in the pattern forming zone by selectively positionable pins (not shown in FIG. 1), according to the pattern in which the drums were released, and according to the pattern in which the drums are to be formed. The pattern forming operation is related to the particular size range or diameter of the brake drums being handled, and the machine is manually preconditioned to form a particular pattern, for example, one of the patterns shown in FIGURES 7–9.

Figure 1:
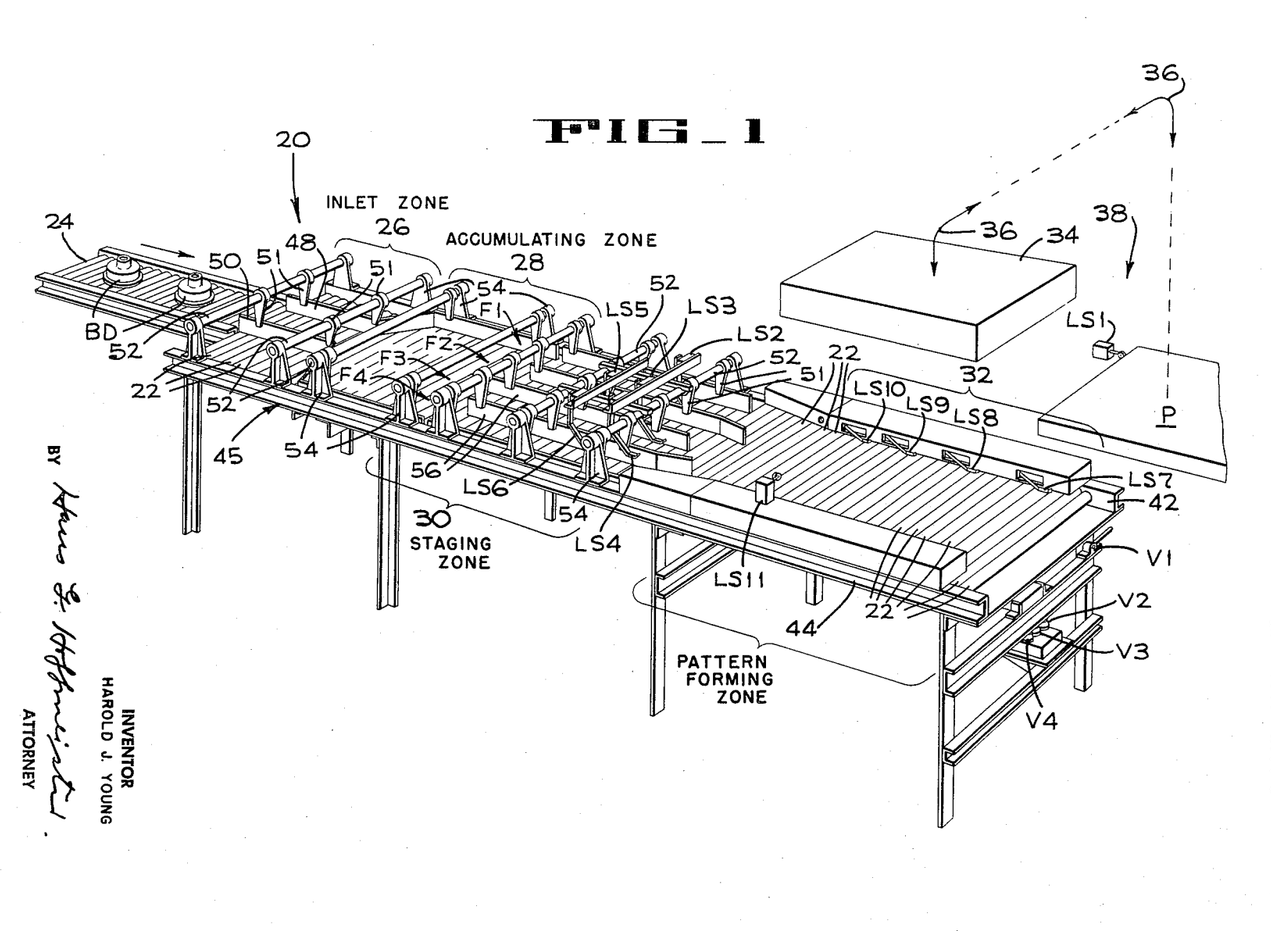
FIGURE 1 is a schematic perspective illustrating the pattern forming machine of the present invention.

All patterns occupy the same area so that one size of pallet will handle all drum patterns. After the machine is once adjusted, it will automatically form repetitive single layer patterns of the brake drums in accurate transverse and longitudinal alignment. Each layer pattern of drums is removed from the pattern forming zone 32 by an electromagnetic gripper 34 of an associated palletizing machine, not shown. As indicated by the arrows 36, the gripper 34 is movable vertically toward and away from the pattern forming zone 32, and laterally back and forth between said zone and a position above a vertical stacking zone 38. The gripper moves vertically toward and away from a pallet P at the bottom of the stacking zone.

Figure 5:
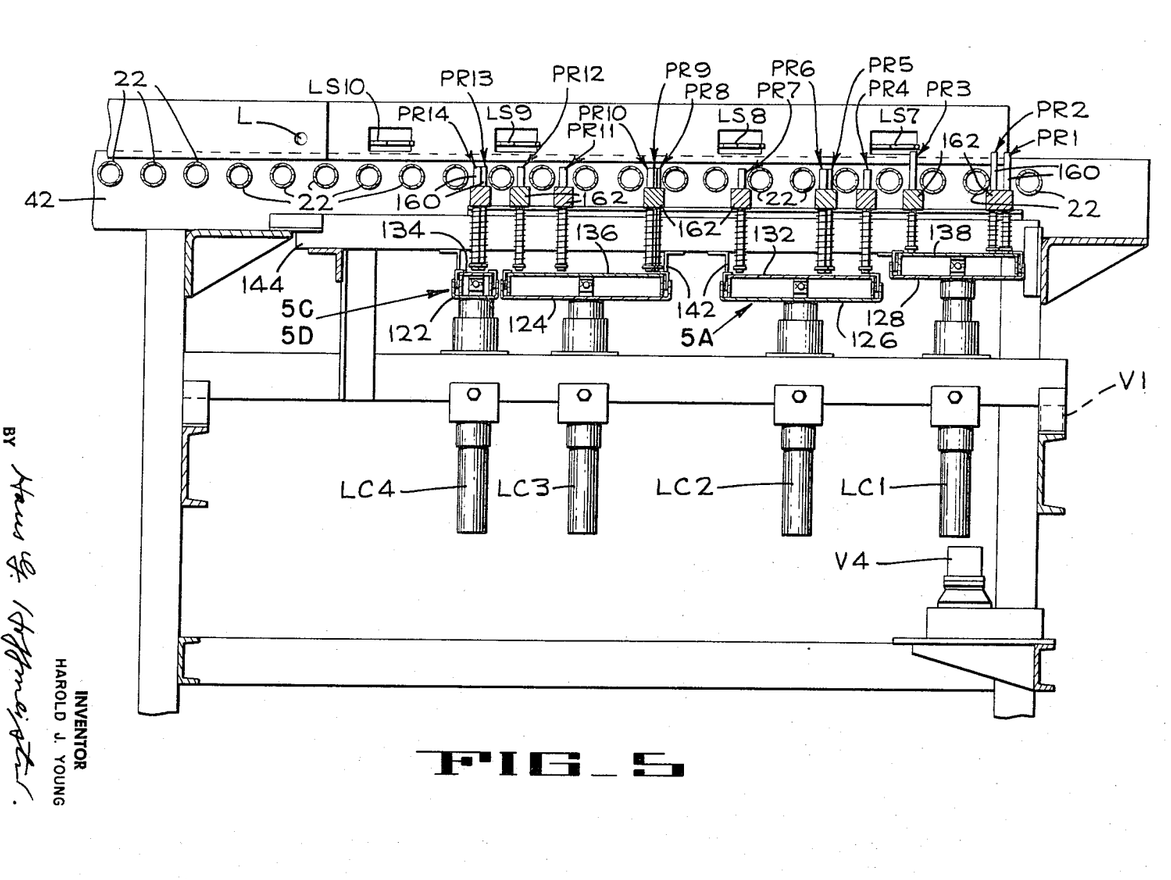
FIGURE 5 is a schematic longitudinal section taken along lines 5—5 on FIGURE 2B.
Figures 5, 6, 7:
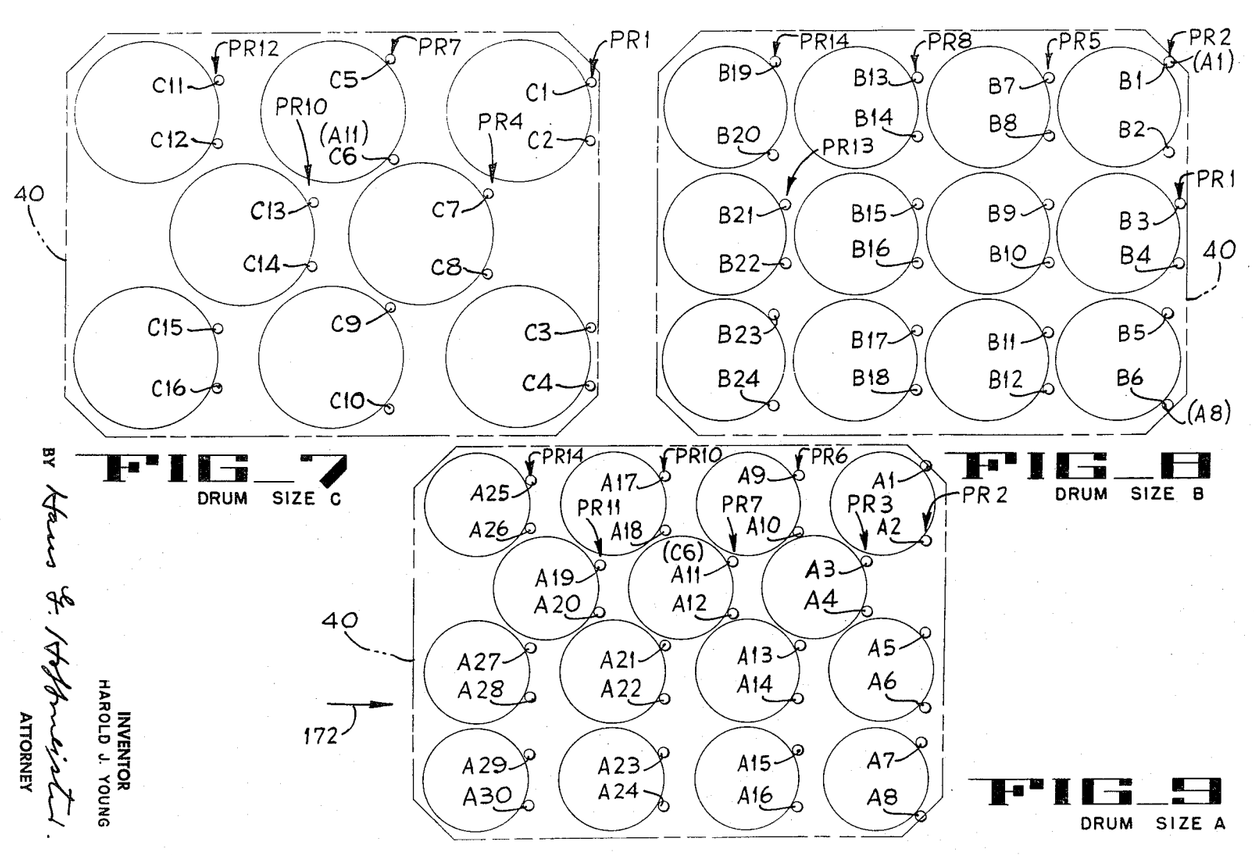
Figure 5A:
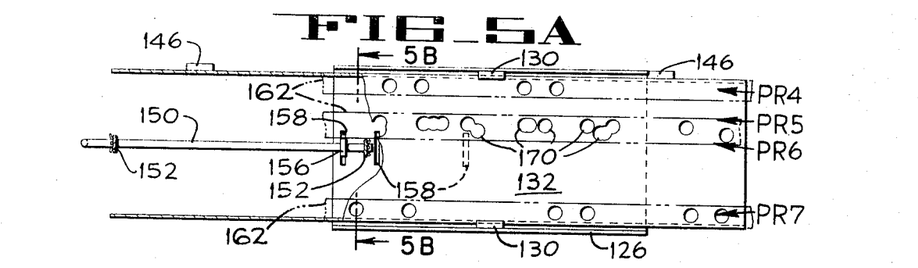
FIGURE 5A is a schematic plan of the structure indicated generally by the arrow 5A on FIGURE 5.
Figure 5B:
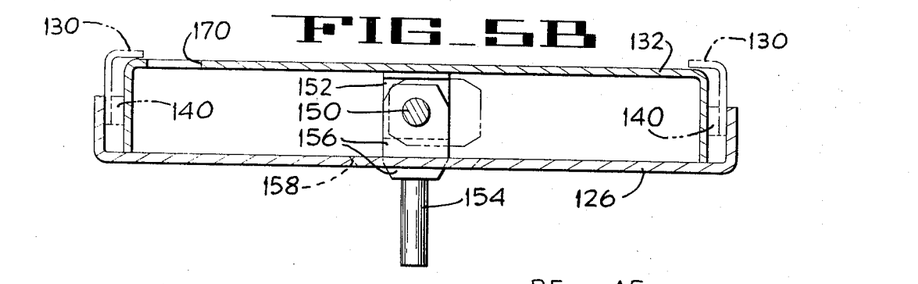
FIGURE 5B is a schematic section taken along lines 5B—5B on FIGURE 5A.
Figures 5C, 5D:
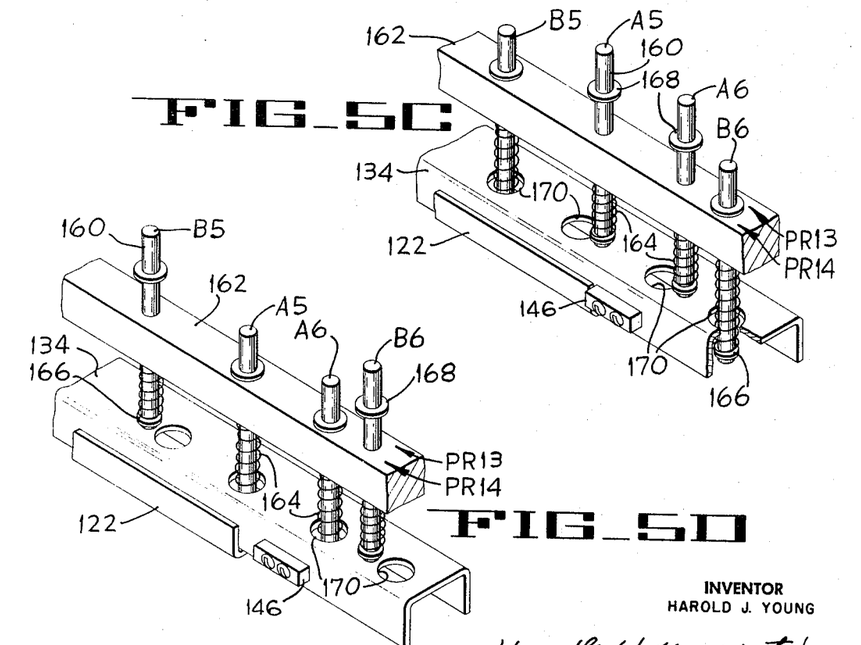
FIGURES 5C and 5D are enlarged fragmentary perspectives of mechanism indicated generally by the arrow 5C and 5D on FIGURE 5.
Figure 6:
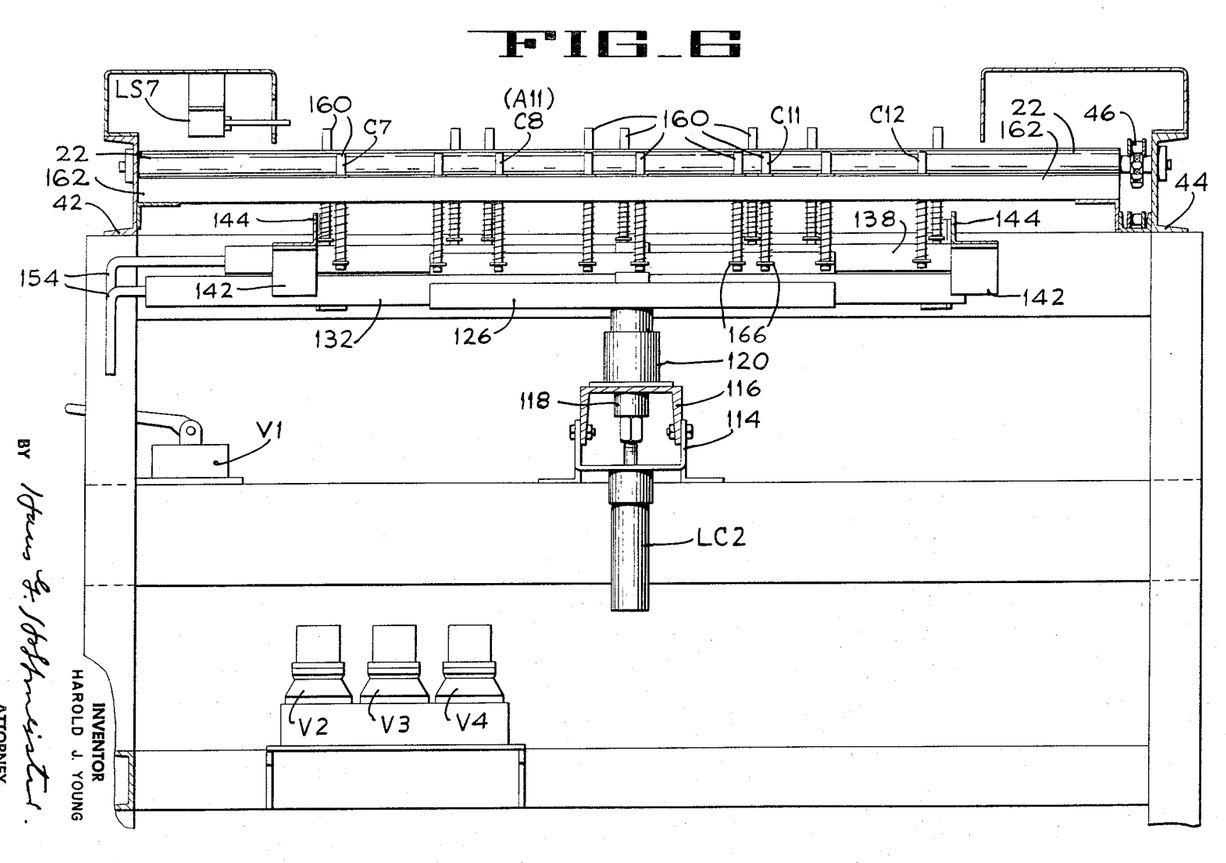
FIGURE 6 is a transverse schematic and enlarged section taken along lines 6—6 on FIGURE 2B.

Layer upon layer of the accurately assembled groups of brake drums are deposited upon the pallet P with interspersed plywood separator panels, indicated in phantom lines 40 in FIGURES 7–9, following which the stack may be banded with metal tie straps and removed for storage or shipping.

Figure 2A:
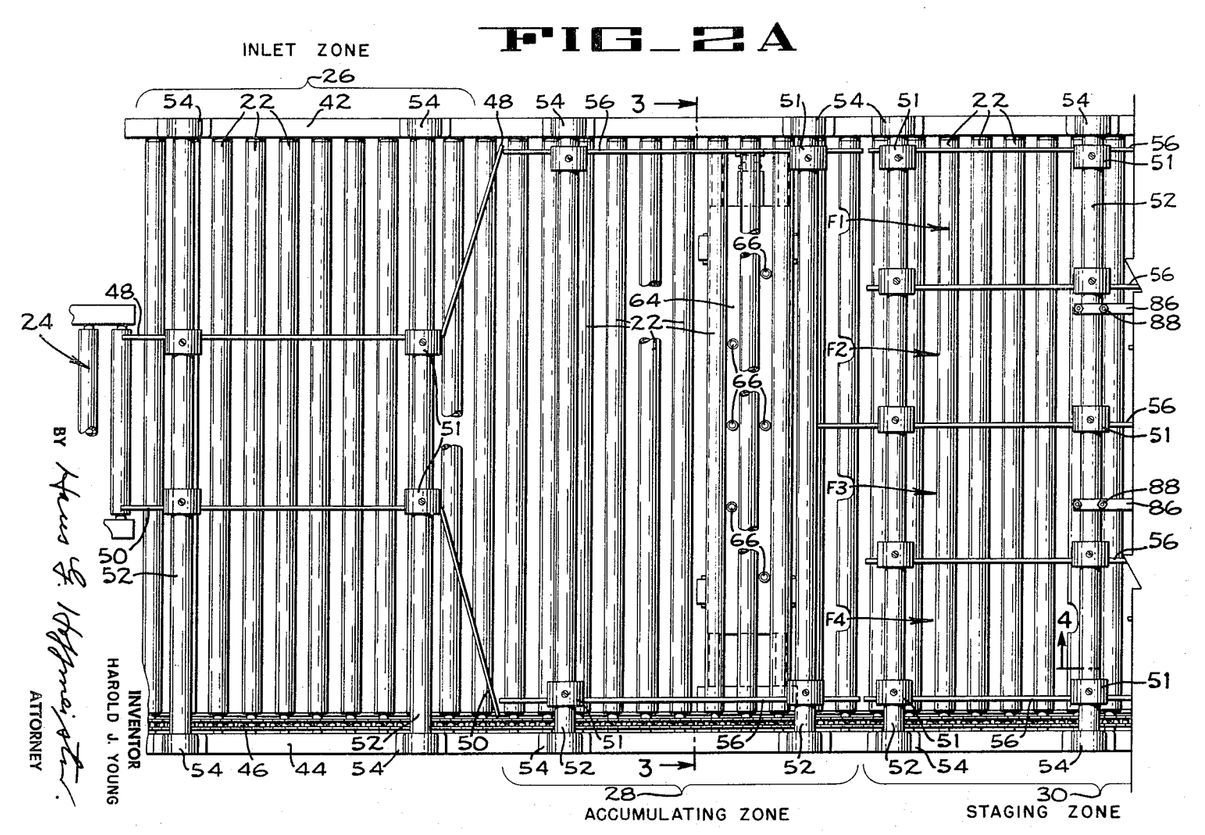
FIGURES 2A and 2B are partial schematic plans of the machine shown in FIGURE 1, and in conjunction with each other illustrate the over-all machine.

More specifically, the conveying rollers 22 (FIGS. 1 and 2A) extend between longitudinal, floor-supported side rails 42 and 44 of a fabricated frame structure 45. Each roller is provided with a drive sprocket that lies adjacent the side rail 44 and is meshed with the upper flight of a roller chain 46. The chain is continuously driven by a motor, not shown.

Incoming brake drums from the conveying means 24 (FIG. 2A) enter between and are guided by lateral guide rails 48 and 50. The rails are suspended by hangers 51 from transverse support bars 52, and diverge at the inlet end of the accumulating zone 28. The support bars 52 are mounted in brackets 54 that are secured to the side rails 42 and 44.

At the outlet end of the accumulating zone 28, the brake drums, assuming that the smallest size range of drums is being handled, enter one of four longitudinal feed lanes F1, F2, F3 and F4 that are defined by a plurality of guide rails 56. The rails 56 are mounted in the same manner as the guide rails 48 and 50 by hangers 51 on transverse support bars 52, and by brackets 54. All of the hangers 51 are capable of being locked in adjusted positions on the support bars 52 so that the number of longitudinal feed lanes can be varied according to the desired brake drum pattern. In the present instance, the machine as illustrated is set up to handle the FIGURE 9 brake drum pattern which is formed from the four longitudinal feed lanes F1–F4. In the case of the brake drum patterns shown in FIGURES 7 and 8, only three feed lanes are required.

In order to assure that the brake drums entering the accumulating zone 28 will not jam or "bridge" into self-locking patterns that will prevent one or more of the feed lanes from being supplied with drums, a power driven bridge breaker 58 (FIGS. 3 and 3A) is provided. The bridge breaker 58 is reciprocably mounted on a pair of transverse rods 60 that are secured to the frame 45. Two spaced bosses 62 are slidably mounted on the rods 60 and support a mounting plate 64 that carries five upstanding breaker pins 66. The breaker pins are mounted in fixed sleeves 68 and can be selectively moved into effective positions in which they project upwardly beyond the plane of the conveyor rollers 22, or into ineffective positions in which their upper ends lie beneath said plane. The purpose of having the breaker pins so mounted is to accommodate the three and four lane drum input so that the effective breaker pins are substantially in alignment with the guide rails 56.

Figures 3, 3A, 3B:
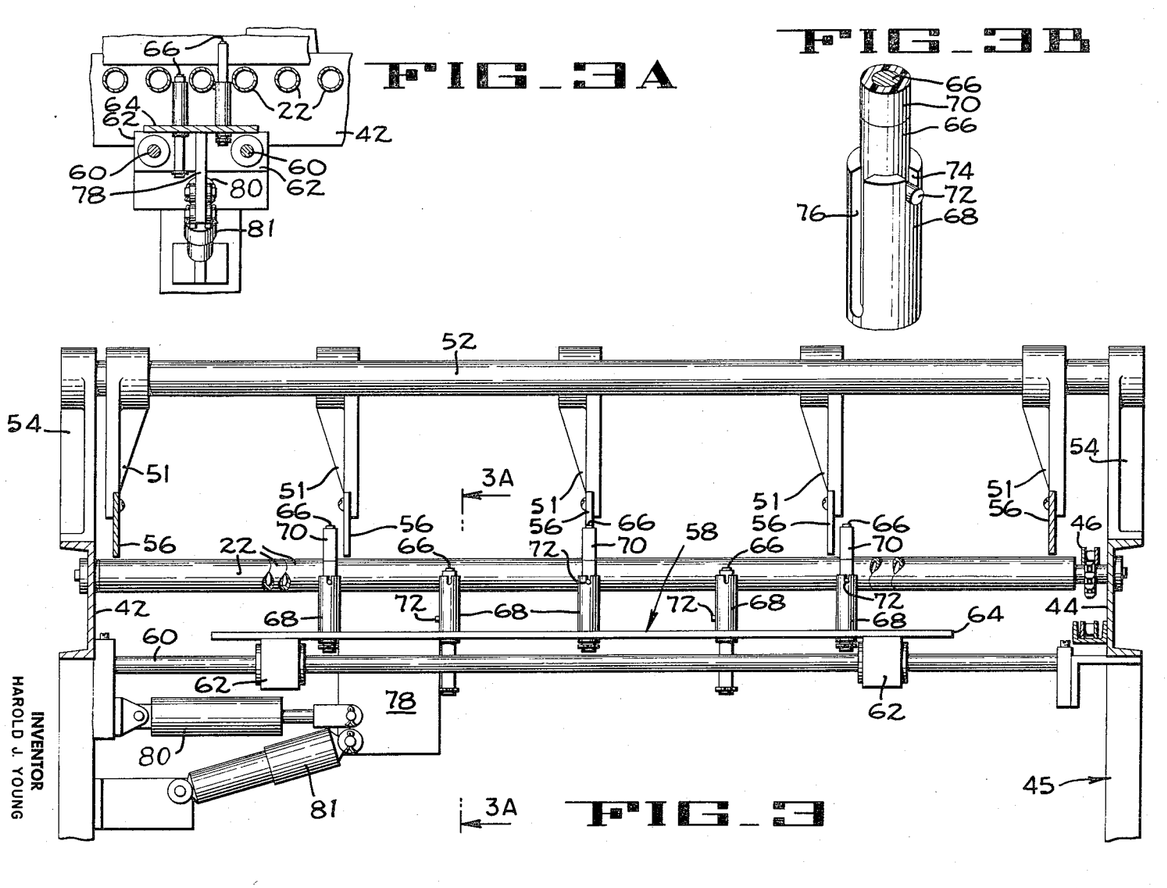
FIGURE 3 is a schematic transverse section taken along lines 3—3 on FIGURE 2A.
FIGURE 3A is a fragmentary schematic section taken along lines 3A—3A on FIGURE 3.
FIGURE 3B is an enlarged fragmentary schematic perspective of one of five retractable pins shown in FIGURE 3.

Each breaker pin 66 is provided with a resilient protective sleeve 70 on its upper end portion to prevent damage to the brake drums, and has a laterally projecting lock pin 72 (FIG. 3B). When the lock pin is seated in a shallow notch 74 in the sleeve 68, the breaker pin 66 is in its effective position, and when the lock pin is seated in a deep notch 76, the breaker pin is in ineffective position.

The mounting plate 64 for the breaker pins is provided with a depending lug 78 that is pivotally connected to the piston rod of a self-reversing double acting air cylinder 80 that is secured to the farme 45. When the air cylinder 80 is driving the bridge breaker 58 back and forth along the rods 60, changes in the driving direction are damped by a shocker absorber 81 that interconnects the frame 45 and the lug 78. Control of the air cylinder 80 is by means of an on-off manually operated valve 82 (FIG. 12) which connects the cylinder to a main pressure line 84.

Figure 2B:
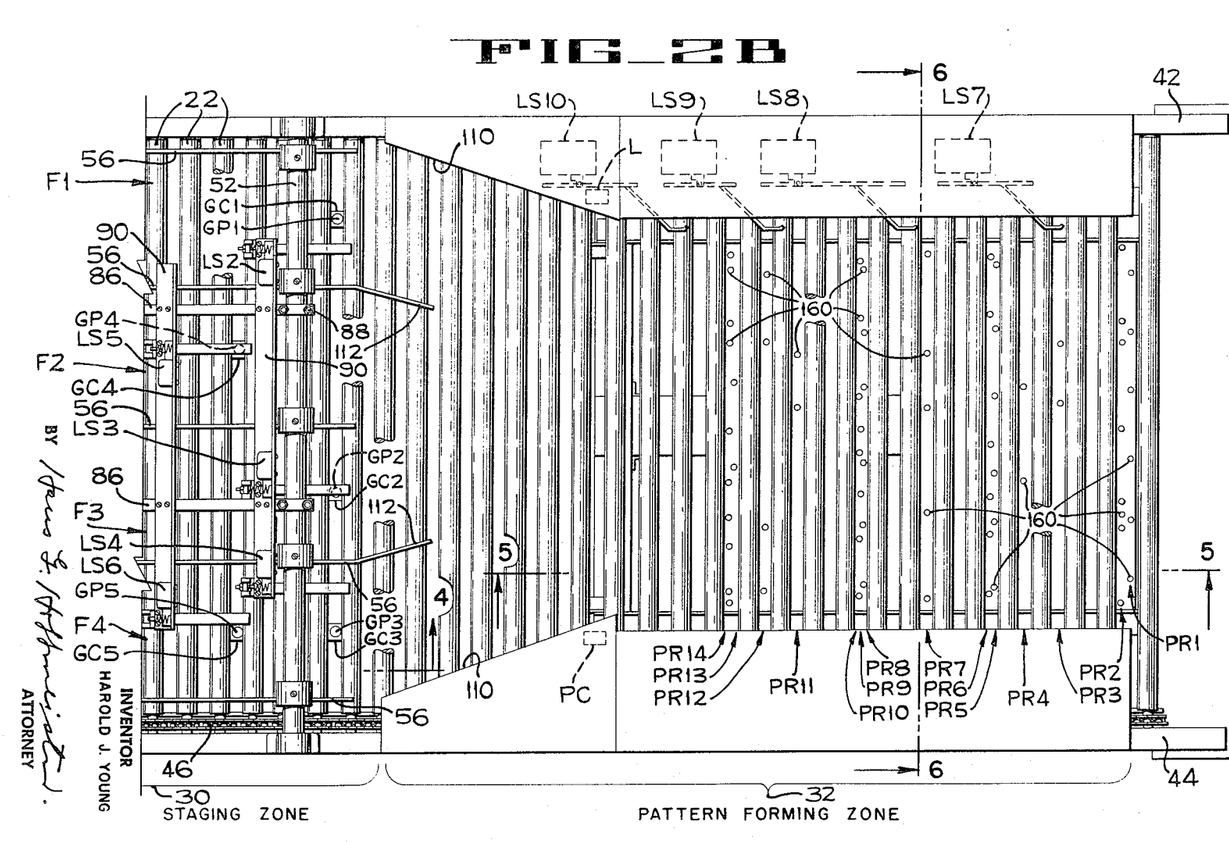

Near the outlet ends of the feed lanes, the last two overhead support bars 52 (FIGS. 2A, 2B and 4) are interconnected by two transversely spaced bars 86 that are clamped to the support bars by U-bolts 88. Bars 86 are in turn interconnected by transverse angle bars 90 that support a plurality of electrical switches. Feed lane F4 (FIG. 2B) is provided with a switch LS6 having a drum feeler 92 (FIG. 4) which lies above a gate pin GP5, and with a switch LS4 whose drum feeler 92 lies above a gate pin GP3. The other feed lanes F1, F2 and F3 are respectively associated with switches LS2, LS5 and LS3, which switches have their drum feelers respectively superposed above gate pins GP1, GP4, and GP2. It will be seen that the leading transverse row of gate pins GP1, GP2 and GP3 lie in lanes F1, F3 and F4 and that the trailing transverse row of gate pins GP4 and GP5 lie in lines F2 and F4. For the particular fifteen drum pattern herein considered and shown in FIGURE 9, the gate pin GP5 is not used. Each gate pin is mounted on the piston rod of a double acting gate cylinder GC1–GC5 which is clamped, in an adjusted position transversely of the machine, upon a channel bar 91.

Figure 4:
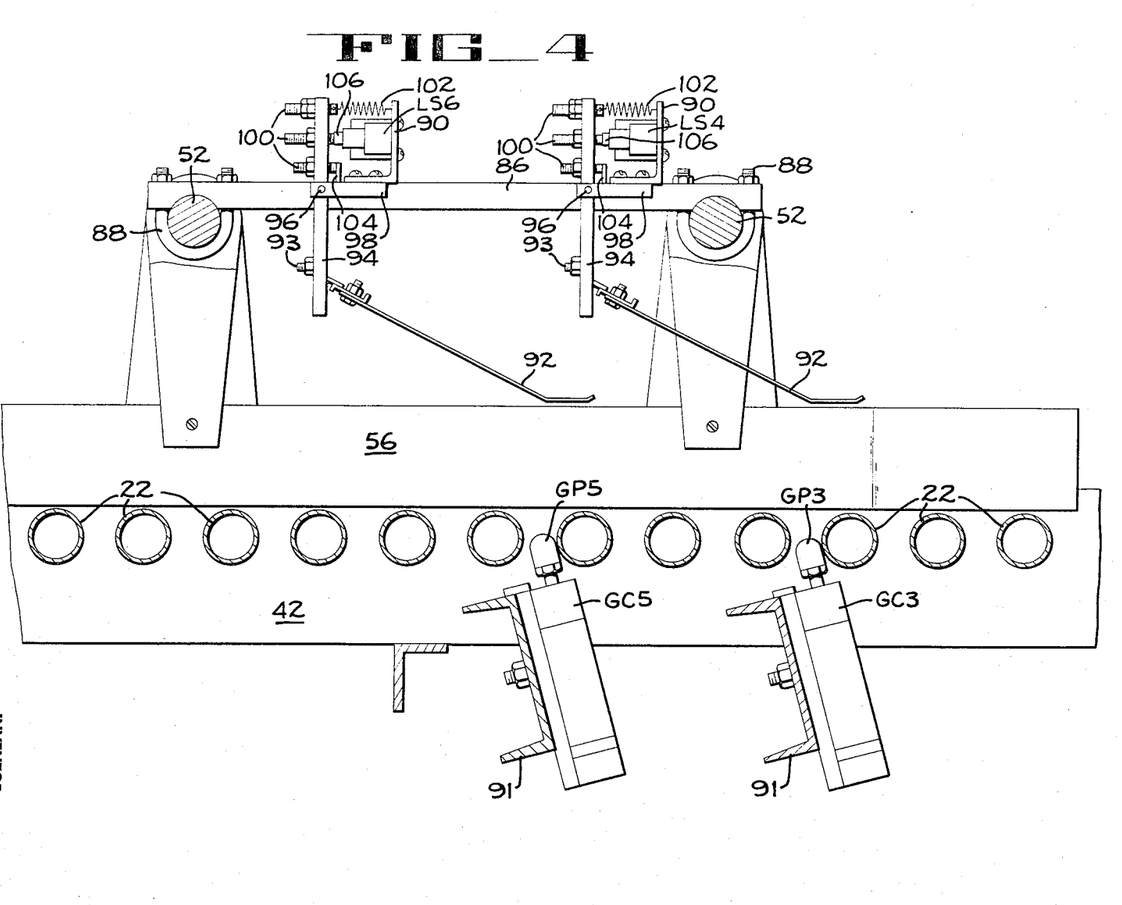
FIGURE 4 is an enlarged schematic longitudinal section taken along lines 4—4 on FIGURES 2A and 2B.

All of the switches LS2–LS5, and actuating means for all of the gate pins GP1–GP5 are constructed according to the details shown in FIGURE 4. Thus, each drum feeler 92 is secured by a bolt 93 to a slotted portion, not shown, of an upright channel-shaped lever 94 which is pivoted at 96 to a block 98 that is bolted to the adjacent angle bar 90. Three endwise-adjustable studs 100 are threaded through the lever 94 above the pivot point at 96. The upper stud is connected to a spring 102 that is coupled to the angle bar 90 and resiliently urges the drum feeler 92 downward. The lower stud abuts a stop block 104, and the intermediate stud holds the actuator 106 of the switch depressed until the drum feeler 92 is lifted by a brake drum. When the number of feed lanes is changed for a different drum pattern, any of the switches LS2–LS6 which may not be used can be isolated by loosening the bolt 93 and sliding the drum feeler 92 upward to a point where it will be clear of the drums.

All of the switches LS2–LS6 have normally closed contacts which are held open in the absence of any brake drums to lift their associated drum feelers 92. As later described in connection with the hydraulic and electric diagrams, each switch LS2–LS6 in said condition indirectly controls its associated gate cylinder GC1–GC5. Each gate cylinder, when energized in one direction, causes the corresponding gate pin GP1–GP6 to be held below the plane of the conveying rollers 22. Energization of the gate cylinders in the other direction causes the gate pins to project upwardly beyond the plane of the rollers.

When an incoming drum is sensed by the drum feeler 92, the associated switch LS2–LS5 (LS6 is not used in the present instance) closes, and its gate cylinder is energized to project the gate pin up into the hollow chamber formed by the downturned large diameter end of the drum. The drum is thus arrested by contacting an effective gate pin with its internal annular wall surface. For this reason, each gate pin is formed of, or may be covered with, a resilient material so as to prevent damage to the inner wall surface of the brake drum. Most important is the fact that arresting the drum in this manner, rather than by contacting the outer surface of the drum, eliminates the necessity of critical timing which would otherwise be required because of the fact that the incoming drums might be abutting one another.

After a complete transverse row of drums is in place over the gate pins GP1–GP4, all of the drums are simultaneously released by retracting the gate pins. Later described timing mechanism holds the gate pins down until the next transverse row of drums is over the gate pins, at which time the pins again rise to effective positions. The released drums are guided inwardly toward the longitudinal centerline of the machine by vertical walls 110 in the case of the outer feed lanes F1 and F4, and by inwardly bent end portions 112 of the guide rails 56 for feed lanes F2 and F3.

Referring now to FIGURES 5 and 6, the pattern forming zone 32 includes double acting pneumatic lift cylinders LC4, LC3, LC2 and LC1 over which the incoming drum rows successively pass, and by means of which a certain predetermined pattern of later described stop pins 160 are automatically raised into the paths of the drums to arrest them in positions corresponding to the desired drum pattern.

Each lift cylinder LC1–LC4 is secured in upright position to a U-shaped strap 114 that is mounted on a centrally located fixed frame beam 116. The piston rod of each lift cylinder is threaded into a cylindrical shaft 118 that is slidable within a fixed boss 120. On the upper end of the shafts 118 respectively associated with lift cylinders LC4, LC3, LC2 and LC1 are mounted channel shaped lifters 122, 124, 126 and 128. The position of the lifter 128 in FIGURES 5 and 6 illustrates the common upper limit of movement for all lifters when their cylinders are energized to project the piston rods upward.

Since the lifters and associated structure are similar, a description of the lifter 126 and coacting mechanism shown in FIGURES 5A–5D will suffice for all. The lifter 126 intermediate its ends is provided with a fixed, inwardly turned angle member 130 at each side to provide vertical retention of a channel shaped stop pin slide 132. Slides 134, 136 and 138 are provided for the respective lifters 122, 124 and 128.

Each angle member 130 (FIG. 5B) has an antifriction block 140 which bears against the slide 132 and keeps the slide laterally centered within the lifter. To preserve the longitudinal alignment of the two channel shaped members 126 and 132, one side of the ends portions of the slide 132 (FIGS. 5 and 6) contacts a fixed vertical guide flange 142 that is supported by one of two longitudinal angle bars 144. With the described construction, each lifter is vertically movable, and each slide is adjustable endwise in the lifter. Endwise movement of the slide 132 (FIG. 5A) is limited by stop blocks 146 that are secured to the slide. Angle members 130, angle bars 144, and stop blocks 146 are provided for the other lifters and slides in the same manner and for the same purpose.

The stop pin slides 124, 126 and 128 (FIGS. 5, 5A and 5B) each have three operative positions between the stop blocks 146 and within their respective lifters. The narrow stop pin slide 134 has only two operative positions within its lifter 122, for reasons which appear later. Each slide is manually adjustable in the manner shown for the slide 132 in FIGURES 5A and 5B, wherein a control rod 150 is rotatably mounted in axially fixed position in lugs 152 that depend from the undersurface of the top plate of the slide. The outer end portion of the control rod 150 has a bent handle portion 154, best shown in FIGURE 6, which is accessible to an operator who manually adjusts the endwise position of each stop pin slide before the pattern forming machine 20 is placed in operation. A locking lug 156 is secured to the control rod 150 and can be selectively positioned in one of three slots 158 that are provided in the lifter 126.

In each of its three positions, certain ones of various apertures in the slide 132 register with the superposed stop pins 160 that are mounted above the slide, whereby different selected positions for the slide will cause the different stop pins to be raised when the lifter 126 is raised by the air cylinder LC2. More particularly, specific transverse pin rows of the stop pins 160 (FIGS. 2B and 5) are identified as PR1 to PR14, inclusive. Pin rows PR1, PR2 and PR3 are associated with the downstream slide 138. Slide 132 is associated with pin rows PR4, PR5, PR6 and PR7. Pin rows PR8, PR9, PR10, PR11 and PR12 lie over the slide 136, and the slide 134 is adapted to actuate the pins in rows PR13 and PR14.

For convenience in later reference to the different operative positions of the slides in actuating different rows of the stop pins 160, the three different size ranges of brake drums BD (FIGS. 7–9) will be referred to as A, B and C, respectively corresponding to the small, medium and large drums which are illustrated, and to other intermediate sizes smaller than the illustrated drums. The particular stop pins which arrest the respective drums in the A, B and C size ranges will be referred to as A, B or C pins with numerical suffixes. Thus, pins A1–A8 lie in pin rows PR1 and PR2 and arrest A size range drums, pins B1–B6 lie in pin rows PR1 and PR2, and arrest B size range drums, and pins C1–C6 lie in pin row PR1 and arrest C size range drums.

Returning now to FIGURES 5, 5C and 5D, each stop pin 160 is mounted for vertical sliding movement in one of a series of fixed transverse bars 162 that are mounted beneath the conveying rollers 22. When the stop pins are raised, they move upwardly in the spaces between adjacent conveying rollers. A compression spring 164 abuts both the undersurface of the bar 162 and a snap ring 166 on the lower end portion of the stop pin to urge the pin to a lowered position. Such lowered position is limited by another snap ring 168, and the upper end of the pin normally lies beneath the plane of the upper surfaces of the rollers 22 if the associated slide is not raised, or if the slide is raised and one of a plurality of apertures 170 (FIGS. 5A, 5C and 5D) lies in alignment with the pin.

Since each aperture 170 is larger in diameter than the pin structure which may be aligned therewith, raising movement of the slide permits the pin to lie in its lowered, ineffective position. All pins which are not aligned with subjacent apertures wll be lifted into effective positions in which they lie in predetermined locations in the paths of the particular size drums being handled.

The A size range of drums (FIG. 9) is assembled by releasing three transverse rows of four drums each from the gate pins at the end of the staging zone 28 (FIG. 1), and a final row of only three drums. Initially, the stop pin slide 132 (FIG. 5) is manually pre-adjusted so that stop pins A1–A8 in pin rows PR2 and PR3 will be raised to effective positions. To raise these pins, a hand operated on-off valve V1 (FIGS. 1, 6 and 12) is energized to project the piston rod of the lift cylinder LC1 after endwise adjustment of the slide 132 has been carried out. After a later mentioned electrical selector switch is manually adjusted to one of three positions corresponding to drum size ranges A, B or C, and when a complete transverse row of drums has been assembled at the gate pins GP1–GP4 (FIG. 2B), the row is automatically released and is conveyed by the rollers 22 in the direction of the arrow 172 (FIG. 9).

That drum adjacent the left side of the machine successively actuates switches LS10, LS9, LS8, and LS7 (FIG. 2B) that are longitudinally and vertically adjustable to accommodate drums of different diameters and contours, and which control sequential raising of the rows of stop pins and other functions mentioned later. After the first row of drums has been seated against the stop pins, the second series of stop pins A9–A16 in pin rows PR6 and PR7 are moved into effective positions by their lift cylinder LC2 (FIG. 5) and the second row of drums is released. This operation repeats for pins A17–A24 in pin rows PR10 and PR11 for the third drum row. Since there are only three drums in the last row, only the gate pins GP1, GP2 and GP3 (FIG. 2B) are next released, and the drums are arrested by stop pins A25–A30 in pin row PR14.

It will be noted that pin rows PR13 and PR14 (FIG. 5) correspond to the stop pin slide 134, but that neither of these rows is used for the C size range of drums in FIGURE 7. Accordingly, as previously mentioned, the slide 134 has only two operative endwise positions, one for each of the A and B size range of drums.

The first incoming transverse row of drums for the pattern comprised of B size range drums (FIG. 8) is stopped by stop pins B1–B6, of which it will be noted that pins B1 and B6 are respectively the same pins A1 and A8. To set up the machine for the B size range drums, the stop pin slide 138 (FIG. 5) is moved and locked into the appropriate endwise position, and the valve V1 is turned on to raise the stop pins B1–B6. The other stop pin slides 132, 134 and 136 are similarly adjusted and locked, and the previously mentoned electrical selector switch is positioned to handle the B size range of drums. Because there are only three drums per transverse row, the lane guide rails 56 (FIGS. 2A and 2B) must be regrouped, to form only three instead of four input lanes, by releasing the set screws on their support hangers 51 and sliding the hangers to new positions on the transverse bars 52. Similarly, the drum sensing switches LS2–LS6 and the breaker pins 66 are correspondingly adjusted. When the machine is started, the sequence of operations in the same for the B size range of drums as for the A size, except that all transverse rows have an equal number of drums, and are successively arrested by stop pins B7–B12 in pin row PR5, stop pins B13–B18 in pin-row PR8, and by stop pins B19–B24 in pin rows PR13 and PR14.

In the case of the largest drums in the C size range of drums in FIGURE 7, one transverse row of two drums is first released by the gate pins and is arrested by stop pins C1–C4 in pin row PR1. Next, two staggered rows of three drums each are released and are arrested by stop pins C5–C10 in pin rows PR4 and PR7, and by stop pins C11–C16 in pin rows PR10 and PR12.

In each case, each assembled layer of drums is automatically removed by the electromagnetic gripper 34 (FIG. 1) and is deposited upon the pallet P, or upon one of the separator panels 40 that are automatically placed upon a previously deposited layer of drums. The cycle repeats until some predetermined number of drums is accumulated in the stack, but removal of the stack and the positioning of a new pallet P does not interrupt the pattern forming operation because there is ample time for the latter operation to occur continuously.

Figure 10:
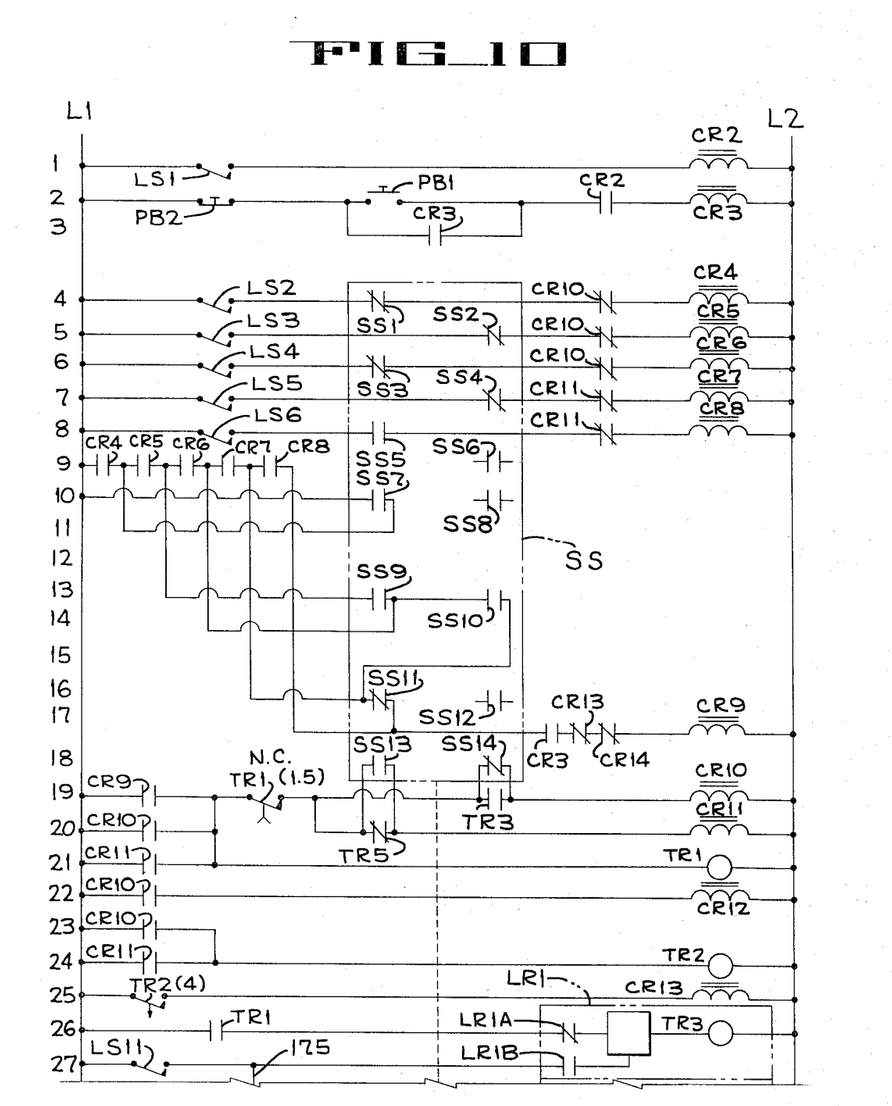
FIGURES 10 and 11 are schematic electrical diagrams for controlling the pattern forming machine.
Figure 11:
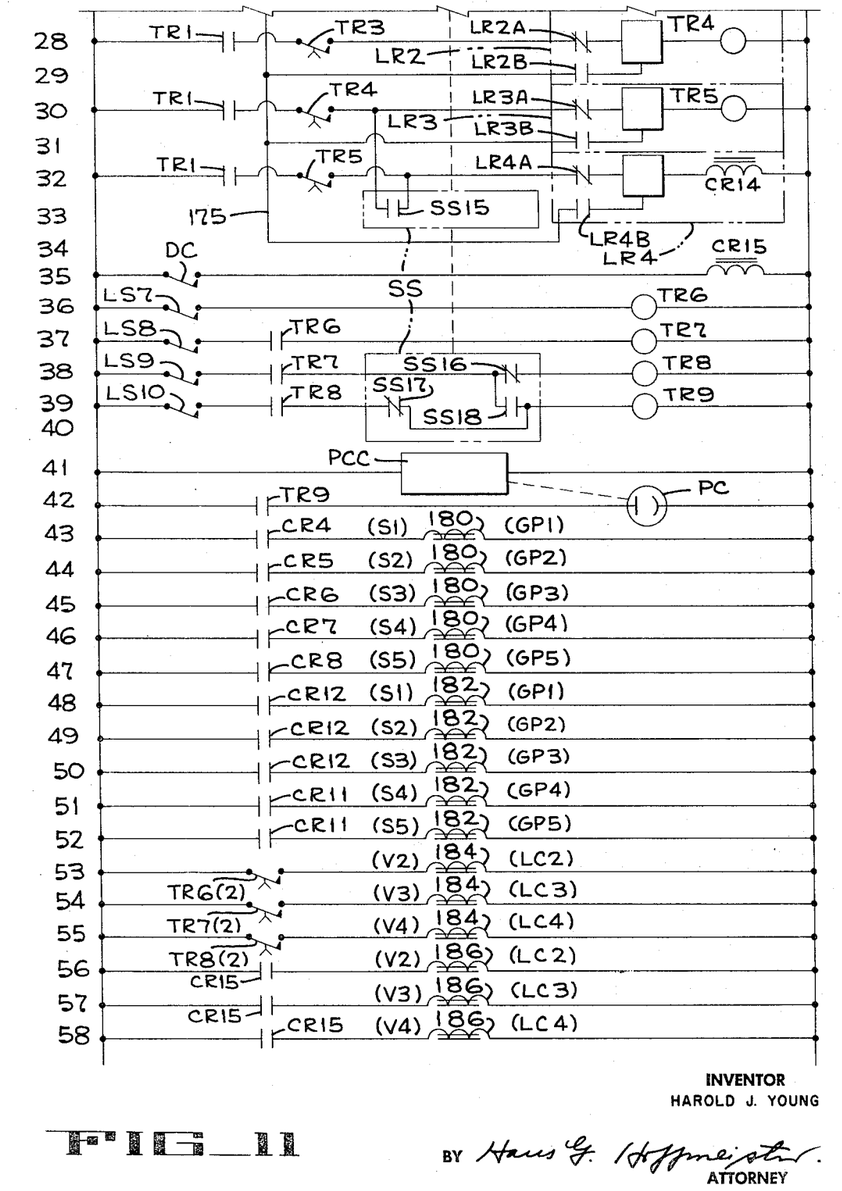
Figures 12, 13:
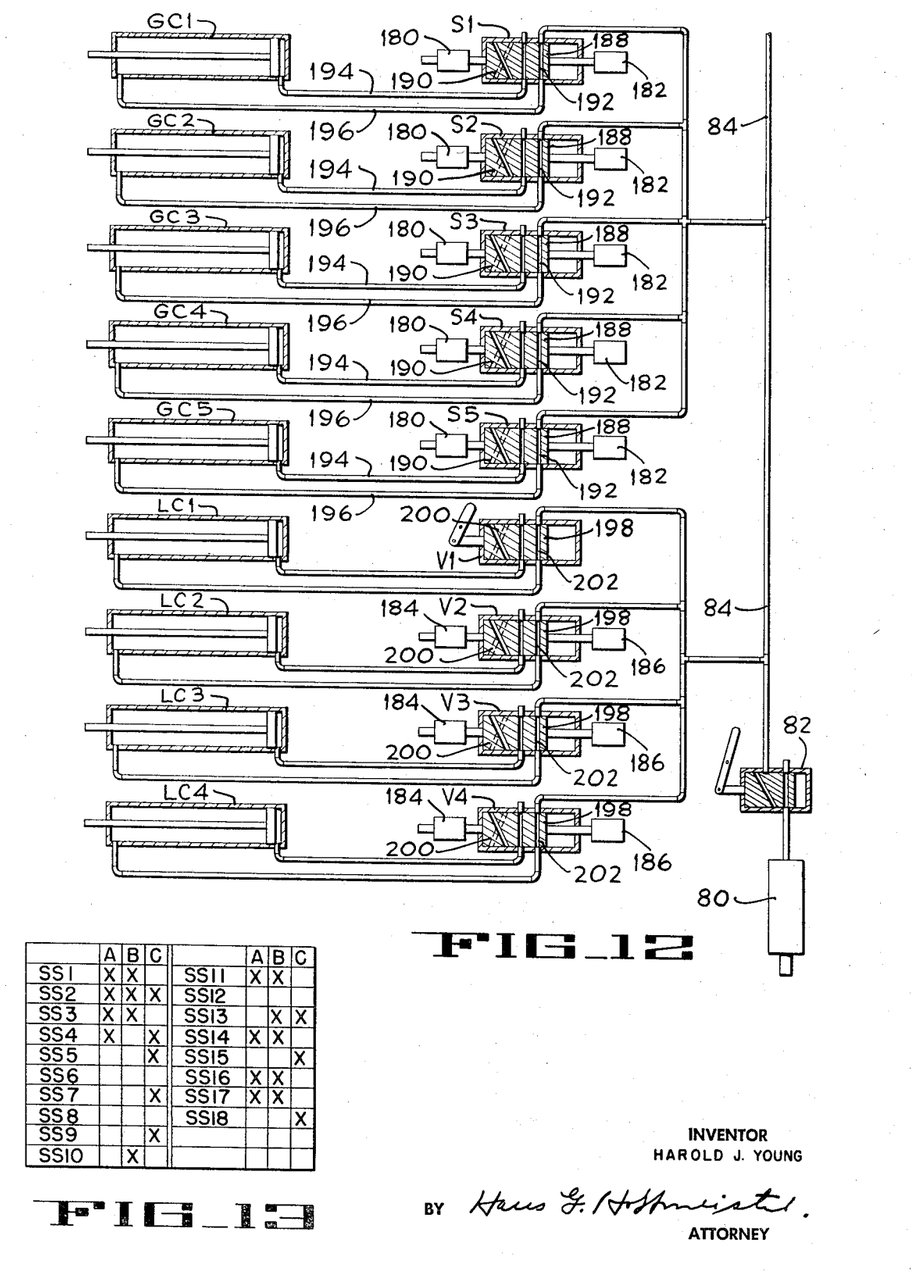
FIGURE 12 is a schematic diagram of the pneumatically operated components of the machine.
FIGURE 13 is a diagram indicating the closed contacts of an electrical selector switch for handling different size ranges of brake drums.

The general functions of the control circuits shown in FIGURES 10–12 are as follows: Brake drums (the A size drums being here considered) arriving at the gate pin locations GP1–GP5 are stopped by the gate pins in the row formation in which they are to be released. When each input lane F1–F4 is supplied with a drum, that transverse row of drums is released, and the succeeding second row drums are stopped in the positions just vacated by the released first row of drums. The second row of drums is stopped 1½ seconds or more after the first row is released. However, the gate pins will not lower for four seconds after the release of a row of drums, whereby the drums rows are spaced apart, due to a conveying speed of 6 inches per second, about 33 inches. No more drums than the fifteen drums comprising the A size drum pattern will be released until the assembled pattern layer of drums has been picked up by the electromagnet 34.

The first released row of drums is arrested by the normally raised stop pins which are lifted by actuation of the manually operated lift cylinder valve V1, and one of the drums in the row activates the sensing switches LS10, LS9, LS8 and LS7. The sensing switches cause the lift cylinders V2–V4 to be successively energized to place their associated stop pins in effective position. Thus, two seconds after switch LS7 is actuated by the first row of drums, the next set of stop pins is raised by the lift cylinder LC2. The other rows of drums are positioned under similar circumstances; a delay period of two seconds, and then the next set of stop pins rise. When the pattern is complete, the last row of drums is scanned by a photocell, to assure that no drums extend out of the pattern forming zone 32, and the electromagnet picks up the assembled layer pattern of drums. Although not shown or herein described, a conventional interlock associated with the palletizing machine will stop the flow of drums for another layer pattern until the first pattern has been removed.

Referring now to the electrical control diagram (FIGS. 10 and 11), the over-all pattern forming cycle may be regulated by a switch LS1, line 1, which is positioned to sense the pallet P (FIG. 1) in correct loading position. Closure of switch LS1 by the pallet energizes a control relay coil CR2 which has normally open contacts CR2 in line 2. Contacts CR2 are in series connection between the power input lines L1 and L2 with a control relay coil CR3, a momentary contact Start switch PB1, and a normally closed Stop switch PB2. Holding contacts CR3 of coil CR3 parallel the start switch; momentary closure of the Start switch thus energizes coil CR3 and the contacts CR3 close to maintain such energization unless the stop switch PB2 is opened.

The previously mentioned electrical selector switch, by means of which the machine is manually preconditioned to handle either the A, B or C size range of brake drums, has normally open switch contacts SS1–SS18 within the three phantom line enclosures SS on FIGURES 10 and 11. When the pattern selector switch SS is set to handle the fifteen drum pattern of A size range drums, its switch contacts SS1–SS4, SS11, SS14, SS16 and SS17 are held closed. Although the contacts SS6, SS8 and SS12 are shown, they are not used with any of the present drum patterns.

Selector switch contacts SS1–SS3, lines 4, 5 and 6, are in series connection with the switches LS2–LS4 (FIG. 2B) and with control relays CR4, CR5 and CR6, respectively, each connection also having a normally closed contact CR10 of a control relay CR10, line 19. Switch LS5 is similarly connected to a control relay CR7 through the selector switch SS4, line 7, and the normally closed contact CR11 of a control relay CR11, line 20. As previously mentioned, the switch LS6 (FIG. 2B) is not used with the pattern for the A size drums, and the selector switch contact SS5, line 8, is accordingly open, together with the other inactive switch contacts.

A full transverse row of four drums reaching the initial stop and subsequent release position at the gate pins GP1–GP4 (FIG. 2B) will thus close the switches LS2–LS5 and cause control relay coils CR4–CR7 to be energized, and the relay contacts CR4–CR7 in lines 43–46 close. These contacts are in series connection with "Up" solenoid actuators 180 for valves S1–S4 (FIGS. 2B, 4 and 12) which respectively control the input flow of air to the gate pin cylinders GC1–GC4 to raise the gate pins GP1–GP4 and hold the drums ready for release. "Down" solenoid actuators 182 (FIG. 12) for each valve S1–S4, when energized, cause the gate pin cylinders to be lowered. The previously mentioned lift cylinder valves V2–V4 are similarly actuated by "Up" solenoid actuators 184 and "Down" solenoid actuators 186.

The energized relay coils CR4–CR7 also close normally open contacts CR4–CR7, line 9, which control relay coil CR9, line 17. Energization of relay CR9, through means including switch SS11, line 16, thus signifies that the drum are ready for release from the gate pins. The closed contacts CR3, and a pair of normally closed contacts CR13 and CR14 are also in series connection with relay CR9. Relay CR9 controls a timing relay TR1, line 21, a control relay CR10, line 19, and a control relay CR11, line 20. Normally closed, timed contacts TR1, line 19, of the timing relay TR1 are interposed between relays CR10, CR11 and contacts CR9. Thus, the closed contacts CR9 energize the timing relay TR1, and for one and one-half seconds its contacts TR1, line 19, remain closed and energize relays CR10 and CR11 through the closed switch contacts SS14, line 18 and normally closed contacts TR5, line 20. Relay CR10 causes the gate pins GP1–GP3 to retract to release the drums. Relay CR11 retracts the gate pin GP4. The timing relay TR1 keeps all of the gate pins down until they can rise clear of the released drums.

Relay CR10 retracts the gate pins GP1, GP2 and GP3 by closing its contacts CR10, line 22, thus energizing a control relay CR12 which has normally open contacts CR12 in series with "Down" solenoids 182, lines 48, 49 and 50, which energize the gate pin cylinders GC1, GC2 and GC3 (FIG. 2B) in feed lanes F1, F3 and F4. The gate pin GP4 for lane F2 is also retracted at the same time, because contacts CR11, line 51, close when the relay CR11 is energized simultaneously with the energization of the relay CR10 that lowered the other gate pins. It will be noted that normally open untimed contacts TR1 on lines 26, 28, 30 and 32 close when the timing relay TR1 is energized. These contacts are respectively in series circuits including latching relays LR1, LR2, LR3 and LR4.

The latching relays LR1, LR2 and LR3 respectively incorporate timing relay coils TR3, TR4, TR5 and the relay LR4 has a control relay coil CR14. Each latching relay is a commercially available unit which includes normally open and normally closed contacts which change their open or closed condition each time the coil TR3, TR4, TR5 or CR14 of the relay is momentarily energized. The rectangle associated with each latching relay indicates a magnetically operated mechanical holding means which maintains the relay contacts in the open or closed position in which they are placed by each energization of the coil of the latching relay. The timing relay coils TR3–TR5 have both timed and untimed contacts.

When the timing relay coil TR1 was energized as previously noted, its contacts TR1, line 26, closed and energized the timing relay coil TR3 of the latching relay LR1; contacts LR1A immediately open upon energization of the coil of the relay LR1, and contacts LR1B, line 27, close. Both contacts remain in these positions until the latching relay LR1 is at some later time again energized.

With the energization of the timing relay coil TR3, its timed contacts TR3, line 28, close 3 seconds later, but at that time the adjacent TR1 contacts are open, so relay LR2 is not energized. The next time relay TR1 is energized, the TR1 contacts energize latching relay LR2. The timed contacts TR4, line 30, close 3 seconds later, but its associated TR1 contacts are by then open, so the latching relay LR3 is not energized until timing relay TR1 is again energized. The same is true for the latching relay LR4; although energization of the latching relay LR3 closed the TR5 contacts, line 32, 3 seconds later, the latching relay LR4 is not energized because the TR1 contacts on the same line are open. Since timing relay TR1 is energized each time a row of drums is ready for release from the gate pins, the above outlined operation causes the latching relays to be sequentially energized, and one function of the ralays is thus to count the rows of drums released.

All gate pins having been simultaneously lowered to release the first row of drums into the pattern forming zone 32, the drums move toward the pattern forming zone and are arrested by the stop pins A1–A8 which are in effective position because of the previous manual actuation of the valve V1 (FIGS. 5, 6 and 12) that energizes the lift cylinder LC1.

It will be noted that the control relay coils CR10 and CR11, lines 19 and 20, de-energize when the contacts TR1, line 19, opens one and one-half seconds after the timing relay coil TR1 has been energized. When the control relays CR10 and CR11 were energized as already described, their contacts CR10 and CR11, lines 23 and 24, closed to energize a timing relay TR2. Timed contacts TR2, line 25, of the timing relay TR2 close, and remain closed until four seconds after de-energization of relay TR2 to energize the control relay CR13. The normally closed CR13 contacts, line 17, for the control relay CR9 thereby open and isolate relay CR9 for a predetermined time; the minimum time delay between the release of successive rows from the gate pins is equal to the combined delay periods of the timing relay coils TR1 and TR2, or a total of five and one-half seconds. Contacts CR10 and CR11 in lines 4–7 thus open and de-energize relays CR4–CR7 in readiness for the next row-arresting operation by the gate pins GP1–GP4.

When the drum (at the left side of the machine facing downstream) contacts the actuator and closes switch LS7 (FIG. 2B), power is supplied to a timing relay coil TR6, line 36, FIGURE 10. After a two second delay, timed contacts TR6, line 53, close and energize the "Up" solenoid valve actuator 184 which supplied air to the lift cylinder LC2 (FIGS 5 and 12) to raise the stop pins A9–A16 (FIG. 9). The delay period assures that each drum in the preceding row of drums is fully seated against the stop pins A1–A8.

From the preceding description, it will be recalled that contacts LR1B, line 27, closed when the latching relay LR1 was energized, and the contacts LR1A were opened. The latching relay LR1 is thus isolated from further energization when the contacts TR1, line 26, close when the timing relay TR1 is next energized. It will be noted that a normally open switch LS11, line 27, is connected to each of the above contacts by a line 175, and that the switch LS11 (FIG. 1) is in a position to be closed when the electromagnet 34 descends into lifting engagement with the assembled drum layer to be picked up from the pattern forming zone 32. When such action occurs, the latching relays LR1–LR4 are again energized to place their associated switch contacts in their initial position in readiness for the assembling of the next brake drum pattern.

Returning to the operation wherein the last brake drum row is released, the gate pin GP4 (FIG. 2B) will not be lowered because only three aligned drums comprise the fourth row. It will be recalled that the control relay CR9, line 17, is a control for the drum releasing cycle to begin, and that it is thus energized for each drum releasing operation when a row of drums is released. For the three drum row, the relay coil CR11 is isolated by the latching relay LR3 opening the contact TR5, line 20. When relay CR11 is thus isolated, the "Down" solenoid actuator 182, line 51, since it is controlled by the normally open contacts CR11, will not be energized when the last row of drums is released. Accordingly, the gate pin GP4 (FIG. 2B) remains up, and no drum will be released from lane F2.

However, the gate pins GP1, GP2 and GP3 in the lanes F1, F3 and F4 are lowered because at the time the control relay CR9 was energized, the control relay coil CR10 and the CR10 contacts in line 22 energized the control relay coil CR12 whereby the contacts CR12, lines 48, 49 and 50 closed and energized their gate pin "Down" solenoid actuators 182.

In summary of the electrical control elements, and by way of describing those not yet mentioned, it will be seen that the control relays CR4–CR8, lines 4–8, raise the gate pins GP1–GP5 (FIG. 2B) and are selectively controlled by the selector switch SS. The control relay CR9 is energized when all of the operative gate pins are holding brake drums for release, and may be termed a cycle control. The control relay CR10 initiates lowering of the gate pins GP1, GP2 and GP3 by energizing their control relay CR12 and the "Down" solenoid actuators 182 on lines 48, 49 and 50. The gate pins GP4 and GP5 are lowered by the control relay CR11 which governs the "Down" solenoid actuators 182, lines 51 and 52.

The control relay CR14 controls release of the last row of drums, and in the A size range drum example set forth, and in conjunction with the timing relay coil TR5, causes only three drums to be released.

A control relay coil CR15, line 34, may be controlled by a switch DC (shown only in FIGURE 11, line 35) which is closed at all times except when the electromagnet 34 (FIG. 1) is ready to descend to pick up an assembled layer of drums, or by other conventional switch means associated with the palletizing machine. Contacts CR15, lines 56, 57 and 58, of the control relay CR15 are in series connection with "Down" solenoid actuators 186. These solenoids respectively control the valves V2, V3 and V4 (FIGS. 6 and 12) that energize the lift cylinders LC2, LC3 and LC4 in a down direction so that all of the stop pins 160 except those in rows PR1, PR2 and PR3 (FIG. 5) are lowered in order to begin a new pattern forming operation after the previous layer is picked up.

The lowering of the electromagnet 34 (FIG. 1) to pick up the drum layer may be conveniently controlled by a photocell control PCC, line 41, which is associated with a photocell PC, line 42, that is energized by contacts TR9 of a timing relay TR9, line 39. The photocell PC (FIG. 2B) is located opposite the switch LS10 and is energized by a light source L which is adjacent switch LS10. Thus, when the last row of drums has closed switch LS10 and is seated against their stop pins 160 out of the light beam, the photocell control PCC is energized and effects the lowering of the electromagnet 34 (FIG. 1) to pick up and transfer the drums to the pallet P.

The pneumatic components (FIG. 12) of the pattern forming machine, some of which have been mentioned in the brief description of the electrical controls, are of conventional, commercially available type. In the case of the gate cylinders GC1–GC5, the "Up" and "Down" pairs of solenoid actuators 180, 182 are respectively arranged to shift the valve cores 188 of the valves S1–S5 so that either crossed passages at 190, or parallel passages at 192 communicate with conduits 194, 196 that are connected to the corresponding gate cylinders. Similarly, the "Up" and "Down" pairs of solenoid actuators 184 and 186 are respectively arranged to shift the valve cores 198 of the lift cylinder valves LC2–LC4 so that either crossed passages at 200, or parallel passages at 202 communicate with conduits 204, 206 that are connected to the corresponding lift cylinders.

FIGURE 13 is a diagram which indicates which of the contacts SS1–SS18 of the selector switch SS (FIGS. 10 and 11) are closed for handling the A, B or C size range of drums to effect the same automatic pattern forming cycle as described for the A size range of drums.

When drums within the A, B or C size ranges are handled, the selector switch is adjusted to the selected size, and the selector switch controls which have an "x" in the column below the drum size range heading are closed. In addition to adjustment of the selector switch, the input lane guides are regrouped or respaced, if necessary, according to the size of drum to be processed. The drum sensing switches LS2–LS6 may require similar adjustments, particularly if the profiles of the drums are different than those drums previously handled. Due to differences in the drum profiles, as well as drum apertures, the switches LS7–LS10 may also require repositioning vertically and/or horizontally. Once the required adjustments have been made, the incoming drums will automatically accumulate into the selected layer patterns by means of operational sequences similar to those described in connection with drums within the A size range. In any case, setting the machine for a given size range of drums and adjusting the various switches and lane guides gives broad utility to the pattern forming machine because drums of many different diameters and profiles can be accommodated. In the example of the invention herein described and illustrated, more than fifteen different types and sizes of drums can be handled.

While a particular embodiment of the apparatus of the present invention has been herein shown and described, it will be apparent that modification and variation may be made without departing from the spirit of the invention, and that the scope of the invention should be limited only by proper interpretation of the claims appended hereto.

Having thus described the invention, that which is believed to be new, and for which protection by Letters Patent is desired is:

1. A pattern forming machine comprising conveying means arranged to receive vehicle brake drums and to convey the drums from a staging zone into a pattern forming zone, means for arranging the moving drums into multiple longitudinal lanes in said staging zone, means for sensing the position of the leading drum in each lane, means controlled by said sensing means for stopping the leading drum in each lane to form a transverse row of drums in predetermined array, means for simultaneously releasing the drums in said row, and means for arresting said released row of drums at said pattern forming zone in the same relative orientation as that in which said row was released.

2. A pattern forming machine comprising continuously driven conveying means arranged to receive vehicle brake drums and to convey the drums in multiple longitudinal lanes to a pattern forming zone, means for sensing the position of the leading drum in each lane at a gate position upstream of said zone, means controlled by said sensing means for stopping the leading drum in each lane to form a transverse row of drums in predetermined orientation, means for simultaneously releasing the drums in said row, and means for arresting said released row of drums at said pattern forming zone in the same relative orientation as that in which said row was released.

3. A pattern forming machine comprising conveying means arranged to receive vehicle brake drums and to convey the drums from a staging zone into a pattern forming zone, means for arranging the moving drums into multiple longitudinal lanes in said staging zone, means for sensing the position of the leading drum in each lane, means controlled by said sensing means for stopping the leading drum in each lane to form a transverse row of drums in predetermined non-linear array, means including said sensing means for releasing said row and stopping the succeeding transverse row of drums, means for arresting said released row of drums at said pattern forming zone in the same relative orientation as that in which said row was released, and control means for repeating said drum releasing and drum arresting cycles.

4. In a pattern forming machine, means for conveying articles along a predetermined path, said conveying means having a vertically apertured conveying flight, a perforate slide mounted beneath an aperture in said conveying flight for movement in horizontal and vertical planes, means mounting a plurality of upright stop pins above said slide, the holes in said slide being selectively registerable with at least part of said pins in accordance with the position of said slide in said horizontal plane, and means for raising said slide into lifting engagement with those of said stop pins in non-registry with the holes in the slide whereby selected ones of the stop pins are projected upward beyond the conveying surface of said conveying flight, and those pins in registry with corresponding holes in the slide remain below the conveying surface of said conveying flight.

5. In a pattern forming machine, an interrupted conveying flight for moving articles along a predetermined path, a slide mounted beneath said conveying flight for both endwise and vertical movement, said slide being provided with a plurality of holes vertically aligned with an open portion of said flight, a pin mounting bar interposed between said slide and said flight and having a plurality of upright stop pins projecting therethrough, the holes in said slide being selectively registerable with at least part of said pins in accordance with the endwise position of said slide, means for locking the slide in endwise adjusted position, and means for raising said slide into lifting engagement with those of said stop pins in non-registry with the holes in the slide whereby selected ones of the stop pins are projected upward beyond the conveying surface of said conveying flight, and those pins in registry with corresponding holes in the slide remain below the surface of said conveying flight.

6. In a pattern forming machine, means for conveying articles along a predetermined path, said conveying means being so constructed that at several points along said path transverse vertical apertures are provided in the conveying surface of said conveying means, a slide mounted beneath each of said apertures in said conveying flight for both endwise and vertical movement, said slides each being provided with a plurality of holes vertically aligned with the corresponding apertures, a fixed pin mounting bar interposed between each slide and said conveying flight and having a plurality of upright stop pins projecting therethrough, the holes in said slide being selectively registerable with at least part of said pins in accordance with the endwise position of said slide, and means for selectively raising said slides into lifting engagement with those of said stop pins in non-registry with the holes in the slide whereby selected ones of the stop pins are projected upward beyond the conveying surface of said conveying flight to arrest articles thereon, and those pins in registry with corresponding holes in the slide remain below the conveying surface of said conveying flght.

7. In a pattern forming machine, means for conveying articles along a predetermined path, said conveying means being so constructed that at several points along said path transverse vertical apertures are provided in the conveying flight of said conveying means, a slide mounted beneath each of said apertures in said conveying flight for both endwise and vertical movement, said slides each being provided with a plurality of holes vertically aligned with the corresponding apertures, a fixed pin mounting bar interposed between each slide and said conveying flight and having a plurality of upright stop pins providing therethrough, the holes in said slide being selectively registerable with at least part of said pins in accordance with the endwise position of said slide, individual power driven means for raising said slides into lifting engagement with those of said stop pins in non-registry with the holes in the slides, and control means for sequentially energizing said power driven means in order to successively lift the slides in a downstream to upstream direction, whereby selected one of the stop pins are projected upward beyond the conveying surface of said conveying flight to arrest successive transverse rows of articles thereon, and those pins in registry with corresponding holes in the slide remain below the conveying surface of said conveying flight.

8. In a pattern forming machine, a live roller conveyor, a slide mounted for both endwise and vertical movement beneath two adjacent spaced apart rollers in said conveyor, means mounting a plurality of stop pins for vertical reciprocation between said rollers, means on said slide for engaging and raising a first selected pin when said slide is raised in a first endwise position, said slide having pin accommodating means for clearing a second selected pin when said slide is raised in a first endwise position, means on said slide for engaging and raising said second selected pin when said slide is raised in a second endwise position, said slide having pin accommodating means for clearing said first selected pin when said slide is raised in said second endwise position, means for shifting said slide between said first and second endwise positions, and means for raising said slide for selectively positioning said stop pins to an article arresting position above the conveying surfaces of said rollers.

9. In a pattern forming machine for arranging vehicle brake drums into predetermined variable patterns, a roller conveyor arranged to transport multiple lanes of drums into a pattern forming zone, spaced transverse rows of upright stop pins mounted beneath the conveyor rollers in said pattern forming zone, each of said rows of stop pins being vertically aligned with a corresponding aperture defined by adjacent conveyor rollers, perforate slides mounted for endwise and vertical movement beneath selected rows of said stop pins, means for locking each of said slides in endwise adjusted position so that selected pins are vertically aligned with perforations in the slide and other pins are aligned with imperforate portions of the slide, each adjusted position of the slides being related to a pattern of brake drums of a given diameter, individual power means connected to each slide and selectively operable to raise the slides into positions wherein only the pins aligned with imperforate portions of the slide are elevated to effective positions in which their upper end portions lie in the paths of the drums on said conveyor rollers, means for sensing each transverse row of drums conveyed into said pattern forming zone, and means controlled by said sensing means for sequentially energizing said individual power means to stop successive incoming transverse drum rows, said stop pins being so arranged collectively that certain pins in effective positions are operable with drums of different diameters.

10. A pattern forming machine comprising a live roller conveyor; means defining a plurality of longitudinal feed lanes in a staging zone adjacent the conveying surface of said conveyor; means for feeding a single file of articles into each of said lanes; means for arresting the leading article in each lane at the downstream end of said staging zone to form a transverse row of arrested articles; a plurality of longitudinally spaced transverse slides mounted for both endwise and vertical movement downstream of said staging zone in a pattern forming zone; said slides being mounted beneath the apertures defined by the rollers of said conveyor; means individual to each of said slides mounting a plurality of stop pins for vertical reciprocation through said apertures, means on said slide for engaging and raising a first selected pin when said slide is raised in a first endwise position, said slide having pin accommodating means for clearing a second selected pin when said slide is raised in a first endwise position, means on said slide for engaging and raising said second selected pin when said slide is raised in a second endwise position, said slide having pin accommodating means for clearing said first selected pin when said slide is raised in said second endwise position, means for shifting said slide between said first and second endwise positions, means for raising said slide for selectively positioning said stop pins to an article arresting position above the conveying surfaces of said rollers; means for sequentially releasing said transverse rows of articles from said staging zone; and means for sequentially raising selected ones of said stop pins by selective actuation of said slide raising means.

11. In a pattern forming machine, a live roller conveyor for transporting vehicle brake drums hub end up, guide means mounted over said conveyor for confining the drums to a single file lane, means for sensing the leading drum in said lane at a predetermined location, and drum arresting means responsive to said sensing means and movable upward between adjacent rollers of said conveyor into the relatively large area circumscribed by the internal wall of said leading drum, the leading drum thereby being stopped by said drum arresting means in precise predetermined position without requiring substantially simultaneous actuation of said sensing means and said arresting means.

12. In a pattern forming machine including a live roller conveyor for transporting a file of vehicle brake drums with the large end of the drums supported by the rollers, drum arresting means comprising power means mounted beneath said rollers, an upwardly extending gate pin arranged for selective movement by said power means between an effective position in which said gate pin projects above the conveying surface of said rollers and an ineffective position in which the pin lies beneath said surface, said gate pin lying in a vertical plane coincident with the centerline path of said drums, and drum sensing means mounted over said conveyor and having an actuating arm lying in the path of the drums supported on said surface, said sensing means being arranged to energize said power means to move said gate pin to effective position when the large end of an approaching drum overlies said gate pin, whereby the pin is projected into effective position and into contact with the trailing portion of the internal wall surface of the drum.

13. In a pattern forming machine, a continuously driven live roller conveyor arranged to receive vehicle brake drums large end down and convey the drums through a staging zone into a pattern forming zone, a bridge breaker including power-oscillated breaker pins lying in the path of the drums adjacent the inlet end of said staging zone to urge the moving drums into multiple longitudinal lanes, guide rails extending throughout said staging zone and cooperatively defining longitudinal lanes to receive the corresponding lanes of drums arranged by said breaker pins, power operated gate pins mounted beneath said conveyor and normally lying remote from the paths of the drums in each lane, each of said gate pins being arranged to individually stop the leading drum of each lane at the down-stream end of said staging zone, and means for individually sensing the leading drum in each of said lanes and for raising the corresponding gate pin into abutting relation with the trailing portion of the inside surface of the drum, the leading drums thereby being immobilized to stop conveying movement of the drums in precise predetermined positions.

14. In a pattern forming machine, a roller conveyor for transporting downwardly open cylindrical articles, guide means mounted over said conveyor for confining the articles to a single file lane, means for sensing the leading article in said lane at a predetermined location, and article arresting means responsive to said sensing means and movable upward between adjacent rollers of said conveyor into the area circumscribed by the internal wall of said leading article, the leading article thereby being stopped by said article arresting means.

15. In a pattern forming machine including a roller conveyor for transporting a file of downwardly open cylindrical articles supported by the rollers, article arresting means comprising power means mounted beneath said rollers, an upright gate pin arranged for selective movement by said power means between an effective position in which said gate pin projects above the conveying surface of said rollers and an ineffective position in which the pin lies beneath said surface, said gate pin being adjacent the centerline path of said article, and article sensing means mounted over said conveyor and having an actuating arm lying in the path of the articles supported on said surface, said sensing means being arranged to energize said power means to move said gate pin to effective position when an article overlies said gate pin, whereby the pin is projected into effective position and the trailing portion of the internal wall surface of the article moves into abutting relation with said gate pin to stop the article.

References Cited by the Examiner

UNITED STATES PATENTS 2,571,790   10/1951   Tomkins ____________ 198—34

EVON C. BLUNK, *Primary Examiner.*

E. A. SROKA, *Assistant Examiner.*